2,794,521
DISC BRAKE

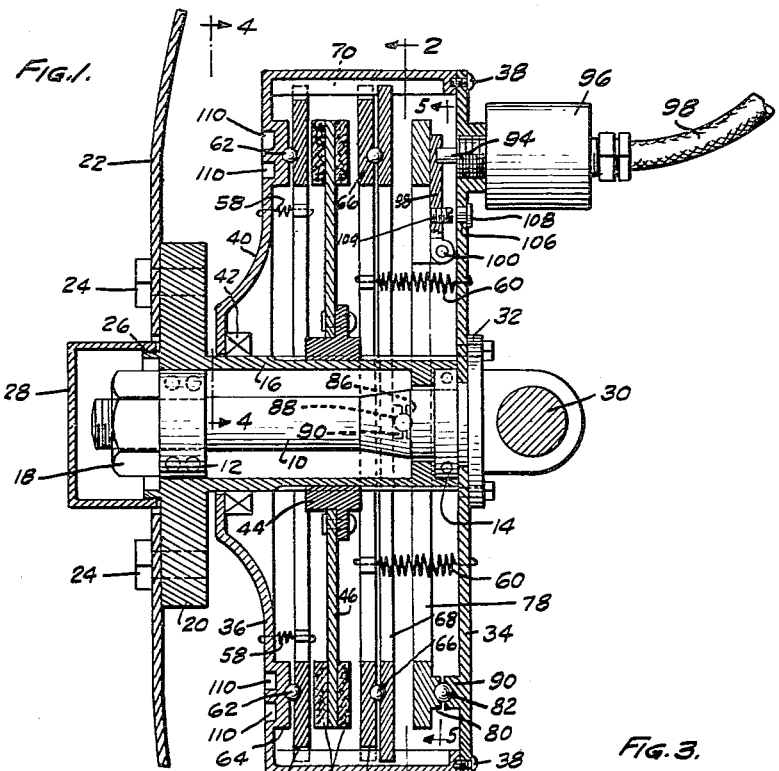

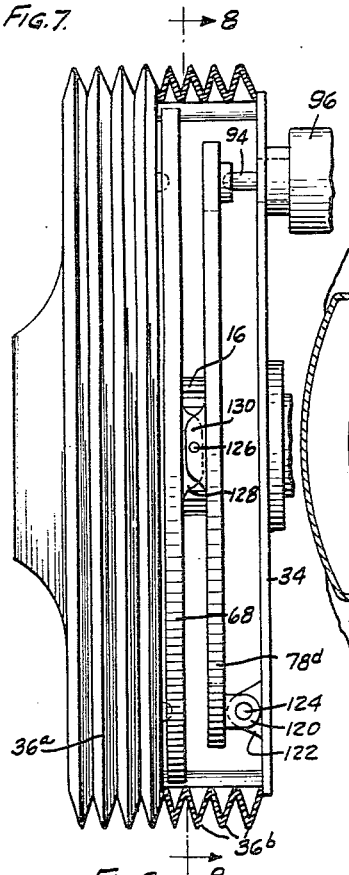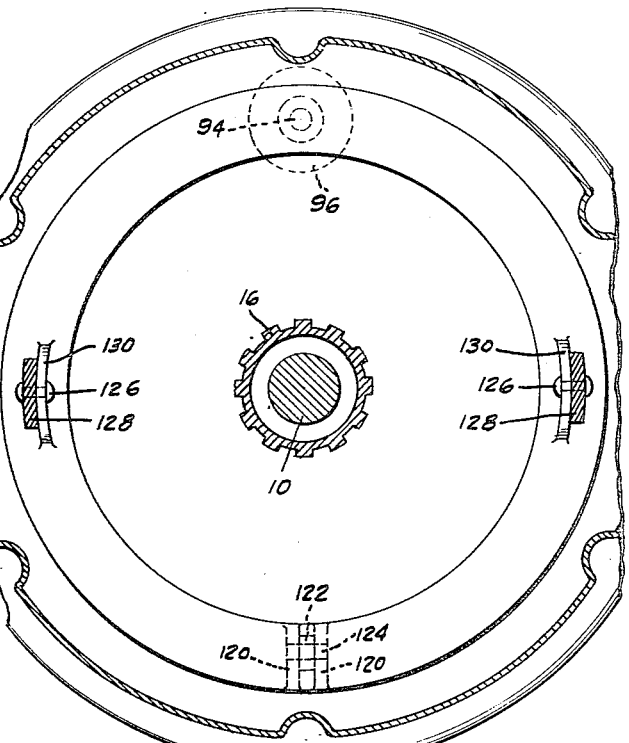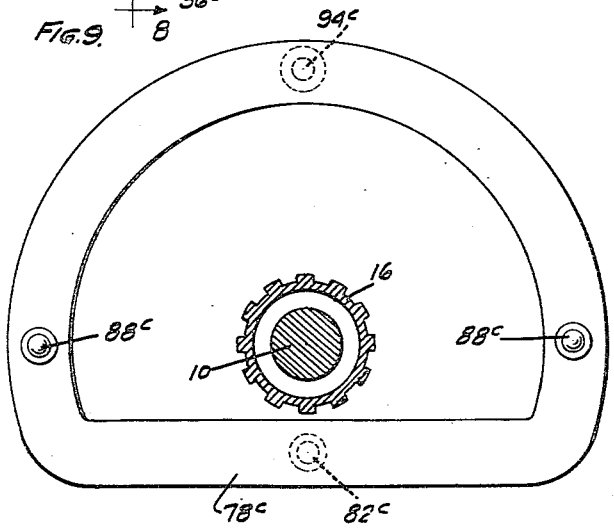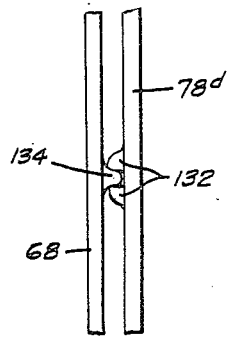

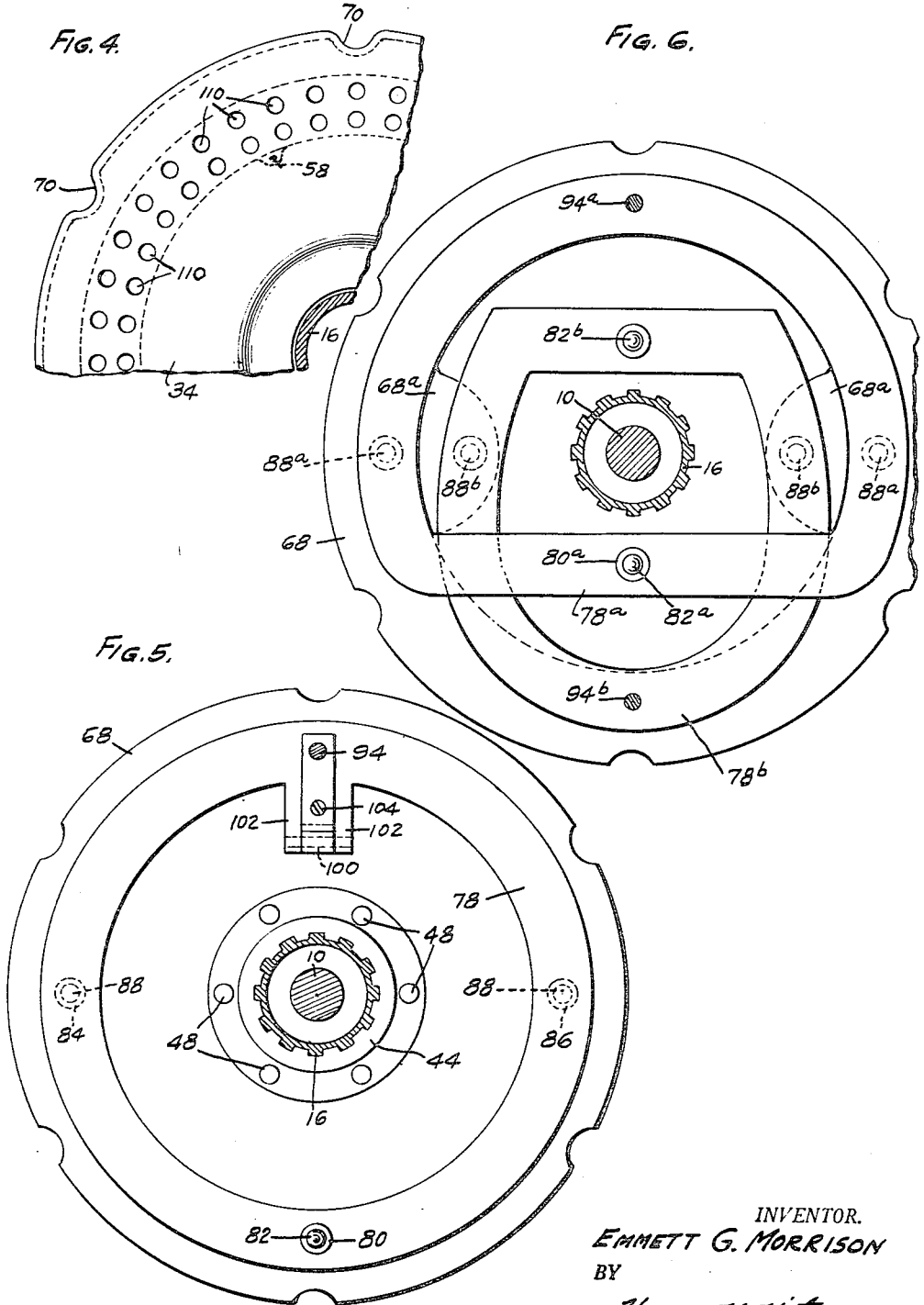

Emmett G. Morrison, Elgin, Ill.

Application April 7, 1955, Serial No. 499,929

11 Claims. (Cl. 188—72)

My invention relates to improvements in brakes for automotive vehicles.

My invention relates more particularly to disc brakes of the self-energizing type wherein during braking, part of the retarding force of the brake rotor or rotors is translated into force acting axially in cooperation with the manually applied force to compress the discs together and thereby create braking friction.

A further object of the invention is to provide a disc brake of the type described which will include a friction disc or brake rotor adapted to rotate in a stationary brake housing, the brake rotor capable of axial movement to assist in the braking action whenever a force is applied to put on the brakes.

A further object of the invention is to provide a construction of the type described wherein braking force will be applied to both sides of a braking disc that is rotating in the brake housing.

A further object of the invention is to provide a brake of the type described wherein the only movable part is the braking disc, the brake housing being made of comparatively light metal so that it will easily dissipate heat.

A further object of the invention is to provide an improved construction of the type described wherein the stationary pressure plates are pivoted at several points about their periphery for equalization and to apply the braking contact evenly at all points to efficiently distribute friction.

A further object of the invention is to provide an improved disc brake of the type described wherein the side of the stationary brake housing may act as one of the stationary braking or energizing discs whenever the brakes are applied.

A further object of the invention is to provide in a brake construction of the type described a single revolving brake plate or disc capable of action on both sides of the same to energize a pair of stationary ring members to separate the same to cause pressure between the faces of said stationary brake plates and the braking surfaces of the revolving brake disc.

A further object of the invention is to provide a disc brake of the type described having a single revolving brake plate or disc and axially movable and partially rotatable energizing plates or discs capable of co-action to effect braking by operation of a single hydraulic cylinder plunger or other lever operation.

A further object of the invention is to provide an improved brake of the type described wherein the stationary brake housing is constructed with parallel spaced cooling fins throughout the surface of the same for dissipating heat produced within the brake.

A further object of the invention is to provide in disc brakes of the type described a pressure plate or ring capable of operation with one or more hydraulic cylinders or with a leverage ratio within limits to effect 2-to-1 or greater leverage from the operating plunger of the wheel cylinder.

A further object of the invention is to construct a disc brake of the type described wherein the pressure ring or energizing ring or plate is pivoted for equalization on ball bearings or other similarly placed pivotal arrangements.

A further important feature of the invention resides in the fact that with my improved construction the hydraulic cylinder for operating the disc brakes can be put on or taken off the brake without removing any part of the brake or the wheel.

A further feature of the invention resides in the fact that when assembled and in operation the brake is completely sealed so that no dirt, water, or moisture can penetrate to the interior of the same.

A further feature of the invention resides in the fact that the brake hub is splined with a male spline to fit in a female spline of the revolving brake disc, and the wheel or the wheel hub may be removed from the brake or replaced in the same without removing or in any way interfering with any part of the brake.

Other objects and advantages will be more apparent from the following description wherein reference is had to the accompanying drawings, upon which Fig. 1 is a vertical sectional view through a front wheel brake of the type described, showing the wheel, brake and associated parts;

Fig. 2 is a cross-sectional view thereof taken generally on the line 2—2 of Fig. 1;

Fig. 3 is a fragmentary sectional view through the pressure ring and the energizing ring taken generally on the line 3—3 of Fig. 2;

Fig. 4 is a fragmentary elevational view of the brake housing and associated parts taken on the line 4—4 of Fig. 1;

Fig. 5 is a detailed sectional view showing the operating lever, pressure ring and associated parts and is taken generally on the line 5—5 of Fig. 1;

Fig. 6 is a similar sectional view of a modified form of double operating lever where two cylinders are employed, and is taken generally in the same plane as section 5—5;

Fig. 7 is a side elevational view of a modified form of housing which is constructed with cooling fins and also has a modified form of connection between the operating lever and the pressure ring;

Fig. 8 is a cross-sectional view through the same taken on the line 8—8 of Fig. 7;

Fig. 9 shows a modified form of operating lever and connection with a hydraulic cylinder wherein a 3-to-1 ratio is obtained from the cylinder; and Fig. 10 is a modified form of pivotal connection between the operating lever and the pressure ring.

In the embodiment of the invention which I have chosen to illustrate and describe the same, I have shown the usual wheel spindle 10 having suitable bearings 12 and 14 to support the hollow wheel hub 16, the spindle 10 being provided with the usual hub retaining nut 18. The wheel hub 16 has an annular flange 20 to which an automobile wheel 22 may be fastened by a peripheral row of bolts 24 in the usual manner. The hub 16 also has a short screw-threaded flange 26 to which a suitable hub cap 28 may be secured in an oil-tight manner.

The spindle 10 may have the usual connection to a king bolt 30 and also has a flange 32 to which the back plate 34 of a stationary drum-shaped brake housing 36 is secured by screw members 38 around its peripheral flange. The brake housing may be outwardly curved as shown at 40 to provide room for an oil seal 42 about the rotating hub 16 of the wheel.

The hub 16, as best shown in Figs. 1 and 2, is provided with peripheral splines 16a upon which the splined hub 44 of a disc rotor 46 is mounted. The rotor 46 may be attached to the hub 44 by a peripheral row of rivets or bolt members 48 and carry about its outer periphery a plurality of spaced brake shoe members 50 fastened to both sides of the plate 46.

With this construction the brake rotor 46 with the brake shoe members 50 upon both faces of the same will be rotated whenever the wheel 22 is turning.

I provide pressure rings 52 and 54 upon opposite sides of the brake rotor 46, the pressure rings having elongated peripheral grooves 56 about the edge of the same and the pressure ring 52 having a plurality of spring members 58 fastened to the drum housing 36 to support the same, and the pressure plate 54 having a plurality of springs 60 connected to the back plate 34 of the housing to support the same.

The spring members also tend to normally pull the pressure rings towards the two sides of the brake housing, the pressure ring 52 against a plurality of ball bearing members 62 mounted against a stationary ring portion 64 of the drum housing and the pressure plate 54 against ball bearing members 66 which bear against a non-rotatable pressure ring 68 upon the opposite side of the brake rotor.

The pressure ring 68 is held against rotation in the drum housing 36 by means of a plurality of annular inwardly directed ridges 70 about the periphery of the housing and the pressure rings 52 and 54 have limited rotary movement about these same ridges by reason of the elongated peripheral grooves 56 in the annular edge of the same.

The ball bearings 66 and 62, as best seen in Fig. 3, are directed in a pair of grooves, a shallow constant depth groove 72 in the pressure ring 68, and a sloping groove 74 in the pressure ring 54, the groove 74 tapering upwardly in both directions so that when the ring 54 is rotated in either direction it will roll on the balls 66 which ride up the cam surface of the groove 74, separating the pressure ring or energizing plate from the stationary plate and moving the energizing plate into frictional contact with the brake shoe members 50 of the rotor 46. By this action the rotor 46 is securing a surface friction braking upon both sides which action is transmitted from both the front and back of the stationary brake housing, as will presently be more apparent.

Means for applying pressure to move the energizing plates 52 and 54 against the brake shoe members 50 on the rotor 46 may include an operating lever 78 which, as best shown in Figs. 1 and 5, is ring-shaped and has a boss 80 adjacent the lower end of the same to receive a ball bearing 82. The lever is further provided with a pair of sockets 84 and 86 upon the opposite side of the same to receive a ball bearing 88. The ball bearing 80 also rests in a socket in a shoulder 90 on the inner face of the back plate 34, and the ball bearings 88 also rest in sockets on forwardly protruding shoulders 90 on the forward wall of the pressure ring 68.

Movement of the operating lever 78 about the ball bearing pivot 82 is obtained by means of a plunger 94 which extends from the end of a hydraulic cylinder 96 connected in the usual manner by a flexible fluid conduit 98 to a pedal operated master cylinder. The plunger 94 presses against the pivoted lever 98 mounted on a pin 100 carried by a pair of arms 102 extending inwardly from the periphery of the operating lever 78. An adjustment to shorten or lengthen the movement of the operating lever 78 about its pivot ball 82 may include a screw member 104 accessible through an opening 106 in the back plate 34. By rotating the screw 104 the lever 98 may be moved to the right away from the operating lever 78 to lengthen or shorten the movement imparted by the plunger 94. A rubber plug member 108 may normally close the opening 106 in the back plate 34.

From the foregoing description it can be seen that with the construction provided, when it is desired to operate the brake of the wheel 22, forward movement of the plunger 94 will swing the upper end of the operating lever 78 to the left (Fig. 1), causing the movement through the balls 88 of the pressure ring 68 to move both the pressure ring 54 and the rotor 46 to the left until the brake shoe members 50 on both sides of the rotor will frictionally grip against the side surfaces of the pressure rings 52 and 54. The slight rotary movement of these plates permitted by the peripheral elongated grooves 56 will act upon the balls 62 and 66 to further move the pressure rings or energizing rings into tighter face frictional contact with the brake shoe members 50 on the rotor 46, with the result that a highly efficient braking action is obtained, and quick, positive and efficient braking results.

Upon release of pressure on the fluid in the cylinder 96, the spring members 60 will pull the energizing plates or rings 54 to the right, and when pressure is taken away from the brake shoe members 50, it can also move to the right and the springs 58 will pull the energizing plates 52 to the left until the balls 62 and the balls 66 come to a normal resting position as shown in Fig. 3. In this position the disc rotor will rotate with clearance upon both sides and no braking action will take effect.

In order to reduce to a minimum the amount of heat produced within the stationary brake housing, I have provided a plurality of rows of holes 110 in the side wall of the housing 36 adjacent the stationary plate or ring portion 64 of the housing. The provision of these rows of holes 110 results in a cutting down or thinning of the material of the brake housing wall at this point, giving more surface for heat to be dissipated from the brake housing.

In Fig. 6 I have shown a modified form of operating levers wherein a pair of hydraulic cylinders may be employed. I use a similar pressure ring 68 and a pair of operating levers 78a and 78b, the operating lever 78a being pivoted with a ball 82a mounted in a groove in a boss 80a on the forward side of the lever and being pushed forward by means of an upper hydraulic cylinder plunger 94a.

This lever may push forward against the pressure ring 68 by means of a pair of ball bearings 88a positioned in a manner similar to that shown in Fig. 1. The second operating lever 78b may be pivoted above the hub by means of a ball bearing 82b in a similar manner with the lower end pressed forward by the plunger 94b of a second hydraulic cylinder mounted adjacent the lower end of the brake housing. It will bear against a pair of inwardly directed ears 68a on the pressure ring 68 by means of a pair of ball bearing members 88b.

With this construction it is of course clear that by means of the use of two operating levers against the pressure ring 68, double the amount of pressure will be provided to move the energizing plates against the brake shoes on the rotor 46. In addition, due to the ratio of leverage between the plungers and their respective pivots, a 4 to 6-to-1 ratio is obtained. In Fig. 9 I have shown a modified construction of this type of ratio multiplication wherein I provide an operating lever 78c pivoted upon a ball bearing 82c and moved forward by means of the plunger 94c of the hydraulic cylinder. Thrust against the pressure ring and energizing plates is obtained by means of the ball bearing members 88c.

In Figs. 7 to 10 I have shown various means of effecting a pivoted connection between the operating lever 78d and the pressure ring or stationary plate member. For example, in Fig. 7 I have provided a pair of ears 120 secured to the right face of the operating lever 78d. The ears surround a shoulder 122 on the inner face of the back plate 34 of the brake housing, and are pivotally connected thereto on a pin 124. The operating lever is moved by the plunger 94 of the hydraulic cylinder 96. It is connected by means of a pair of rivets or pins 126 to the pressure ring 68, the pins 126 passing through raised ears 128 on the pressure ring 68 and similar raised ears 130 on the operating lever 78d.

In Fig. 10 a similar pivotal operation is achieved by means of a pair of spaced bosses 132 on each side of the operating lever 78 which provide a socket for a hump or shoulder 134 on each side of the pressure ring 68.

Another desirable feature of my construction is shown in the modified form of the housing 36a shown in Fig. 7. In this form of the invention the housing may be made with a plurality of spaced peripheral fins or ridges 36b which provide a considerable increase in the amount of brake housing surface from which heat which is generated in the housing may more easily and quickly be dissipated.

From the above and foregoing description it can be seen by those skilled in the art that I have provided a comparatively simple yet highly efficient disc brake assembly wherein the brake housing may be utilized by employing a portion of one of the walls as a braking surface. In addition, by means of the provision of energizing rings or plates upon both sides of a rotating brake disc element and the use of a series of ball bearings to separate the energizing plates and the stationary plates to assist in applying the brakes, a highly efficient and quickly operating brake assembly is provided. Upon release of the braking effort the energizing plates and the pressure rings will immediately move to a non-operating position by reason of the action of the spring members with which they are provided. For adjusting the brakes it is a simple matter to remove the plug 108 and turn the screw 104 to tighten or loosen the braking operation.

The particular method of mounting the brake housing and other elements upon the spindle and the mounting of the friction disc or brake rotor on the splines of the hub provides a construction whereby the wheel or brake or the wheel and brake assembly may easily be removed without disturbing the relationship of the brake elements.

I contemplate that changes and modifictions my be made in the exact details shown and I do not wish to be limited in any particular; rather what I desire to secure and protect by Letters Patent of the United States is:

1. In a vehicle brake assembly for a wheel spindle having a flange adjacent its inner end, a wheel hub on said spindle having a wheel supporting flange adjacent its outer end, said wheel hub having peripheral splines throughout a portion of its length, a brake housing axially mounted over said spindle and hub and having its inner end wall secured to the outer side of said spindle flange, the outer wall of said housing being closely adjacent said hub flange, a brake completely enclosed by said housing and comprising axially mounted non-rotating pressure rings and a rotating friction disc having a splined hub mounted on the peripheral splines of said wheel hub, a pivoted lever in said housing for moving said pressure rings axially into face contact with said rotating friction disc and a hydraulic cylinder mounted on said housing, a movable plunger in said cylinder bearing against one end of said lever and spring means in said housing for returning the parts to inoperative position after each braking operation.

2. In a vehicle brake assembly for a wheel spindle having a flange adjacent its inner end, a wheel hub on said spindle having a wheel supporting flange adjacent its outer end, said wheel hub having peripheral splines throughout a portion of its length, a brake housing axially mounted over said spindle and hub and having its inner end wall secured to the outer side of said spindle flange, the outer wall of said housing being closely adjacent said hub flange, a brake completely enclosed by said housing and comprising a rotating friction plate having a splined hub mounted on the peripheral splines of said wheel hub and axially movable thereon, energizing plates on both sides of said friction plate, a pressure ring adjacent each energizing plate, roller means between each energizing plate and pressure ring for separating the same by slight rotary movement of said energizing plates and a pivoted operating lever in said housing for axially moving said pressure rings toward each other, thereby effecting a friction grip on both sides of said friction plate to cause a braking action.

3. In a vehicle brake assembly for a wheel spindle having a flange adjacent its inner end, a wheel hub on said spindle having a wheel supporting flange adjacent its outer end, said wheel hub having peripheral splines throughout a portion of its length, a brake housing axially mounted over said spindle and hub and having its inner wall secured to the outer side of said spindle flange, the outer wall of said housing being closely adjacent said hub flange, a brake completely enclosed by said housing and comprising a rotating friction plate having a splined hub mounted on the peripheral splines of said wheel hub and axially movable thereon, energizing plates on both sides of said friction plate, a pressure ring adjacent each energizing plate, roller means between each energizing plate and pressure ring for separating the same by slight rotary movement of said energizing plates, an operating lever in said housing for axially moving said pressure rings toward each energizing plate, said operating lever pivoted below the wheel hub and bearing against one of said pressure rings at diametrically opposite points aligned with said hub, the free end of sad lever adjacent the periphery of said housing, and a fluid operated plunger mounted on said housing and bearing against the free end of said lever.

4. In a vehicle brake assembly for a wheel spindle having a flange adjacent its inner end, a wheel hub on said spindle having a wheel supporting flange adjacent its outer end, said wheel hub having peripheral splines throughout a portion of its length, a brake housing axially mounted over said spindle and hub and having its inner wall secured to the outer side of said spindle flange, the outer wall of said housing being closely adjacent said hub flange, a brake completely enclosed by said housing and comprising a rotating friction plate having a splined hub mounted on the peripheral splines of said wheel hub and axially movable thereon, energizing plates on both sides of said friction plate, a pressure ring adjacent each energizing plate, roller means between each energizing plate and pressure ring for separating the same by slight rotary movement of said energizing plates, a pair of pivoted levers in said housing for axially moving said pressure rings against said energizing plates and a pair of fluid operated pistons mounted on said housing for moving said levers.

5. In a vehicle brake assembly for a wheel spindle having a flange adjacent its inner end, a wheel hub on said spindle having a wheel supporting flange adjacent its outer end, said wheel hub having peripheral splines throughout a portion of its length, a stationary cylindrical brake housing axially mounted over said spindle and hub and having its inner wall secured to the outer side of said spindle flange, the outer wall of said housing being closely adjacent said hub flange, the peripheral wall of said housing having inwardly turned ridges therein, a brake completely enclosed by said housing and comprising axially mounted cooperating pressure plates and a rotating friction plate having a splined hub mounted on the peripheral splines of said wheel hub, said pressure plates movable axially in said housing and one or more of said plates capable of slight rotary movement for more effective gripping action against said friction plate, said non-rotating pressure plates having peripheral grooves which engage the peripheral ridges of said housing.

6. In a vehicle brake assembly for a wheel spindle having a flange adjacent its inner end, a wheel hub on said spindle having a wheel supporting flange adjacent its outer end, said wheel hub having peripheral splines throughout a portion of its length, a brake housing axially mounted over said spindle and hub and having its inner wall secured to the outer side of said spindle flange, the outer wall of said housing being closely adjacent said hub flange, the peripheral wall of said housing having spaced inwardly turned ridges therein, a brake completely enclosed by said housing and comprising a rotating friction plate having a splined hub mounted on the peripheral splines of said wheel hub and operatively connected thereto and axially movable thereon, energizing plates on both sides of said friction plate, a non-rotating pressure ring adjacent each energizing plate, each of said rings having peripheral grooves therein to engage the peripheral ridges of said housing, roller means between each energizing plate and pressure ring for separating the same by slight rotary movement of said energizing plates, a pivoted lever in said housing for axially moving said pressure rings against said energizing plates and a fluid operated piston mounted on the inner wall of said housing for moving said lever.

7. In a vehicle brake assembly for a wheel spindle having a flange adjacent its inner end, a wheel hub on said spindle having a wheel supporting flange adjacent its outer end, said wheel hub having peripheral splines throughout a portion of its length, a brake housing axially mounted over said spindle and hub and having its inner wall secured to the outer side of said spindle flange, the lower wall of said housing being closely adjacent said hub flange, the peripheral wall of said housing having spaced inwardly turned ridges therein, a brake completely enclosed by said housing and comprising a rotating friction plate having a splined hub mounted on the peripheral splines of said wheel hub and operatively connected thereto and axially movable thereon, energizing plates on both sides of said friction plate, a non-rotating pressure ring adjacent each energizing plate, each of said rings having peripheral grooves to engage the peripheral ridges on said housing, ball means between each energizing plate and pressure ring for separating the same by slight rotary movement of said energizing plates, a pair of pivoted levers in said housing for axially moving said pressure rings against said energizing plates and a pair of fluid operated pistons mounted on said housing for moving said levers.

8. In a vehicle brake assembly for a wheel spindle having a flange adjacent its inner end, a wheel hub on said spindle having a wheel supporting flange adjacent its outer end, said wheel hub having peripheral splines throughout a portion of its length, a brake housing axially mounted over said spindle and hub and having its inner wall secured to the outer side of said spindle flange, the outer wall of said housing being closely adjacent said hub flange, a brake completely enclosed by said housing and comprising a rotating friction plate having a splined hub mounted on the peripheral splines of said wheel hub and operatively connected thereto and axially movable thereon, energizing plates on both sides of said friction plate, a pressure ring adjacent each energizing plate, roller means between each energizing plate and pressure ring for separating the same by slight rotary movement of said energizing plates, a pair of operating levers in said housing adjacent the inner wall of the same for axially moving said pressure rings toward each energizing plate, said operating levers pivoted one above and one below the wheel hub and bearing against one of said pressure rings at a pair of aligned diametrically opposite points aligned with said wheel hub, the free end of each lever adjacent the periphery of said housing, and a pair of fluid operated plungers mounted on said housing and bearing against the free ends of each of said levers.

9. In a vehicle brake assembly for a wheel spindle having a flange adjacent its inner end, a wheel hub on said spindle having a wheel supporting flange adjacent its outer end, said wheel hub having peripheral splines throughout a portion of its length, a brake housing axially mounted over said spindle and hub and having its inner wall secured to the outer side of said spindle flange, the outer wall of said housing being closely adjacent said hub flange, a brake completely enclosed by said housing and comprising a rotating friction plate having a splined hub mounted on the peripheral splines of said wheel hub and operatively connected thereto and axially movable thereon, energizing plates on both sides of said friction plate, a pressure ring adjacent each energizing plate, roller means between each energizing plate and pressure ring for separating the same by slight rotary movement of said energizing plates, a pair of operating levers in said housing adjacent the inner wall of the same for axially moving said pressure rings toward each energizing plate, said operating levers pivoted one above and one below the wheel hub and bearing against one of said pressure rings at a pair of aligned diametrically opposite points aligned with said wheel hub, the free end of each lever adjacent the periphery of said housing, and a pair of fluid operated plungers mounted on said housing and bearing against the free ends of each of said levers, the pivots of said levers being so positioned that a three-to-one leverage is obtained on each.

10. In a vehicle brake assembly for a wheel spindle having a flange adjacent its inner end, a wheel hub on said spindle having a wheel supporting flange adjacent its outer end, said wheel hub having peripheral splines throughout a portion of its length, a brake housing axially mounted over said spindle and hub and having its inner wall secured to the outer side of said spindle flange, the outer wall of said housing being closely adjacent said hub flange, a brake completely enclosed by said housing and comprising a rotating friction plate having a splined hub mounted on the peripheral splines of said wheel hub and operatively connected thereto and axially movable thereon, energizing plates on both sides of said friction plate, a pressure ring adjacent each energizing plate, facing grooves between each pressure ring and energizing plate, roller means in said grooves between each energizing plate and pressure ring for separating the same by slight rotary movement of said energizing plates, an operating lever in said housing for axially moving said pressure rings toward each energizing plate, said operating lever pivoted below the wheel hub and bearing against one of said pressure rings at diametrically opposite points aligned with said wheel hub, the free end of said lever adjacent the periphery of said housing, and a fluid operated plunger mounted on said housing and bearing against the free end of said lever.

11. In a vehicle brake assembly for a wheel spindle having a flange adjacent its inner end, a wheel hub on said spindle having a wheel supporting flange adjacent its outer end, said wheel hub having peripheral splines throughout a portion of its length, a brake housing axially mounted over said spindle and hub and having its inner wall secured to the outer side of said spindle flange, the outer wall of said housing being closely adjacent said hub flange, a brake completely enclosed by said housing and comprising a rotating friction plate having a splined hub mounted on the peripheral splines of said wheel hub and operatively connected thereto and axially movable thereon, energizing plates on both sides of said friction plate, a pressure ring adjacent each energizing plate, facing grooves between each pressure ring and energizing plate, roller means in said grooves between each energizing plate and pressure ring for separating the same by slight rotary movement of said energizing plates, an operating lever in said housing for axially moving said pressure rings toward each energizing plate, said operating lever pivoted below the wheel hub and bearing against one of said pressure rings at diametrically opposite points aligned with said wheel hub, the free end of said lever adjacent the periphery of said housing, and a fluid operated plunger mounted on said housing and bearing against the free end of said lever, the pivot of said operating lever so positioned that a three-to-one leverage is obtained.

References Cited in the file of this patent

UNITED STATES PATENTS

| | | |
|---|---|---|
| 2,015,729 | Robbins | Oct. 1, 1935 |
| 2,280,599 | Milan | Apr. 21, 1942 |
| 2,320,286 | Lambert | May 25, 1943 |

FOREIGN PATENTS

| | | |
|---|---|---|
| 875,195 | France | June 8, 1942 |